A. A. BAMFORD.
RESILIENT CYCLE FRAME.
APPLICATION FILED JULY 9, 1913.
1,097,509.
Patented May 19, 1914.
2 SHEETS—SHEET 1.
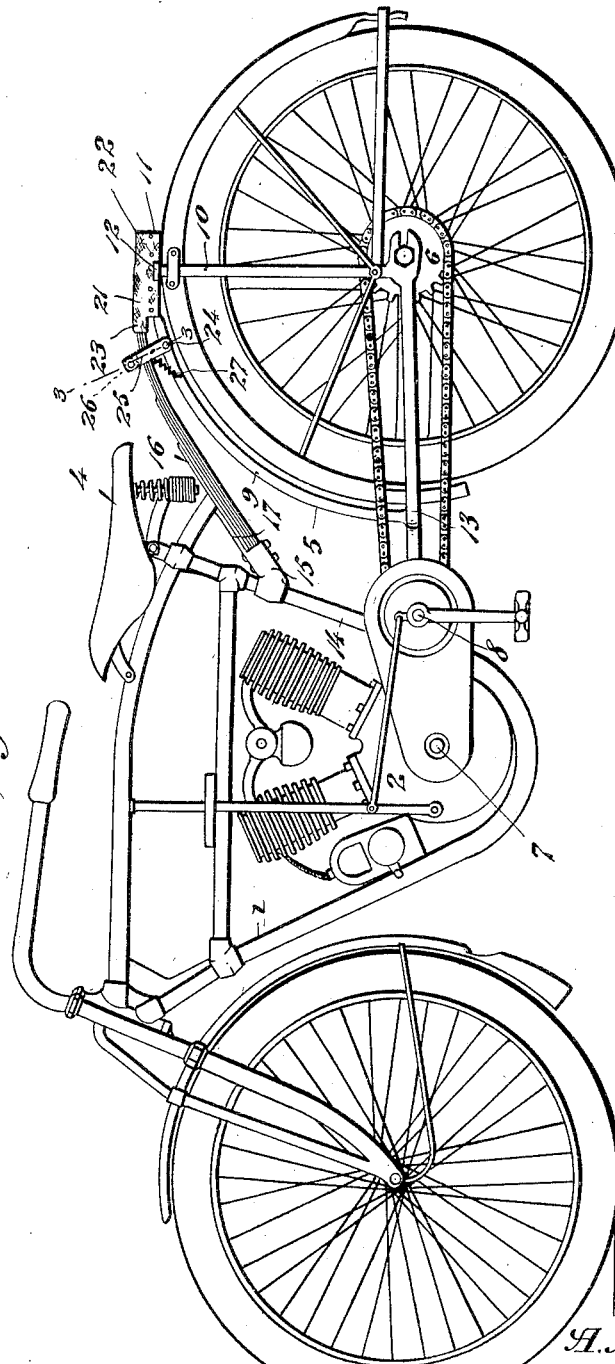
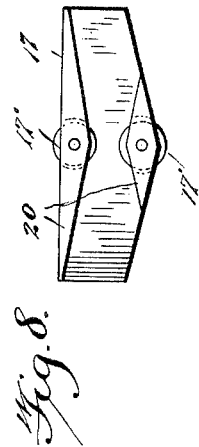
Witnesses
Inventor
A. A. Bamford

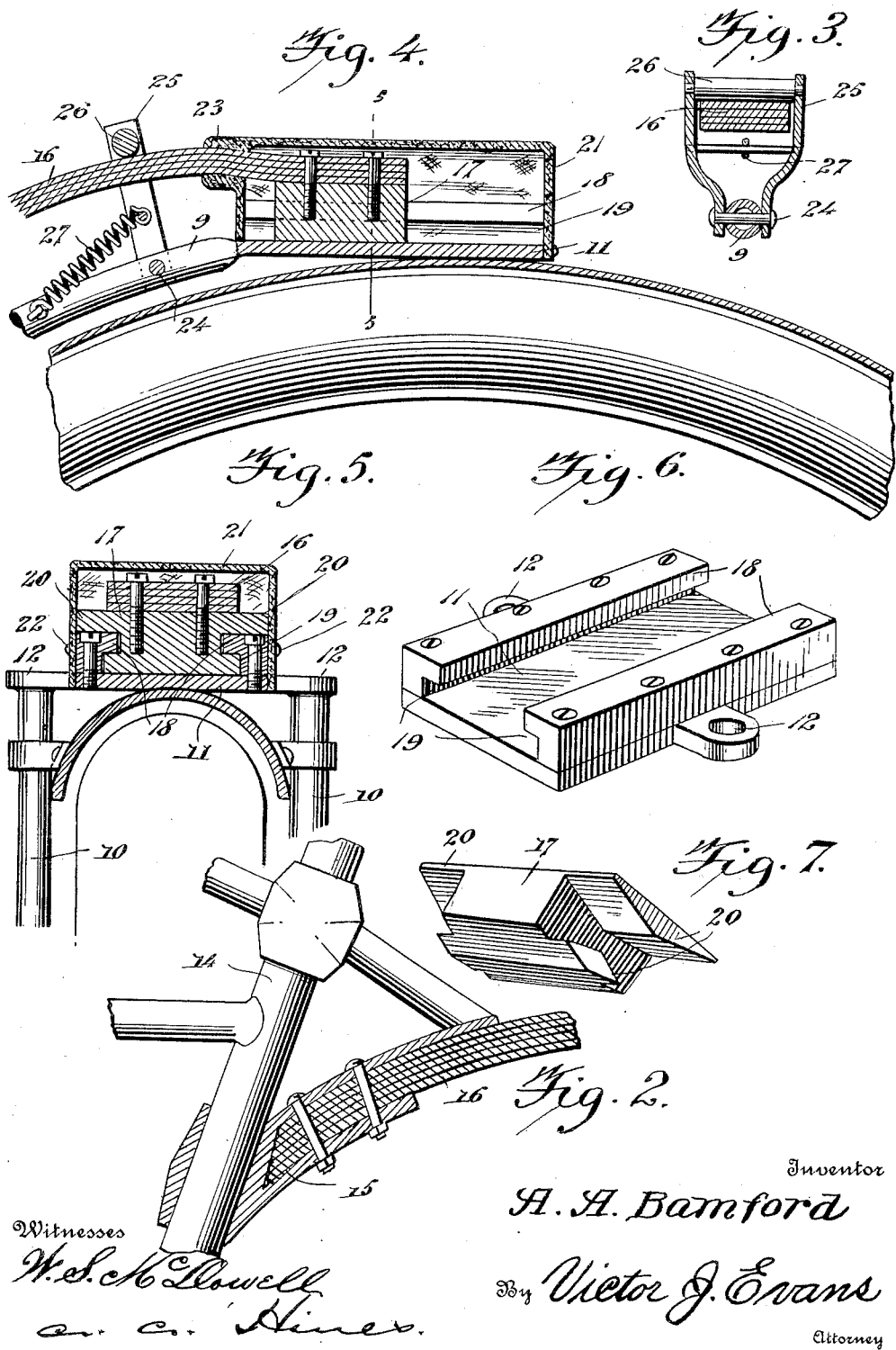

UNITED STATES PATENT OFFICE.

ARTHUR A. BAMFORD, OF CHICAGO, ILLINOIS.

RESILIENT CYCLE-FRAME.

1,097,509.

Specification of Letters Patent.

Patented May 19, 1914.

Application filed July 9, 1913. Serial No. 778,139.

*To all whom it may concern:*

Be it known that I, ARTHUR A. BAMFORD, a citizen of the United States, residing at Chicago, in the county of Cook and State of Illinois, have invented new and useful Improvements in Resilient Cycle-Frames, of which the following is a specification.

This invention relates to improvements in the frame construction of bicycles and motorcycles, and particularly to bicycle and motorcycle frames of the general type shown in my prior Patent No. 1,064,697, dated June 17, 1913, wherein a cushioning spring is interposed between front and rear pivoted frame sections, and is slidably connected with at least one of said frame sections, whereby a free and easy cushioning action is secured.

The object of the present invention is to provide a cushioning spring construction, preferably employing a single leaf spring which is both slidably and pivotally connected with one of said frame sections, whereby the spring is adapted to effectually absorb all shocks, jars and strains, and to also provide simple and efficient means for controlling the recoil of the spring, thus insuring an even, smooth and regulated cushioning action.

A further object of the invention is to provide simple, reliable and efficient means for retaining and controlling the slidably and pivotally connected end of the spring and permitting lubrication thereof, and at the same time housing and shielding such end of the spring from injury and the entrance of dust, dirt, etc.

The invention consists of the novel features of construction, combination and arrangement of parts hereinafter fully described and claimed, reference being had to the accompanying drawing, in which:

Figure 1 is a side elevation, showing the application of the invention to one type of motorcycle frame. Fig. 2 is a longitudinal section through a portion of the cushioning spring, showing the connection between the same and the front frame section. Fig. 3 is a vertical transverse section on the line 3—3 of Fig. 1. Fig. 4 is a vertical longitudinal section through the rear end of the cushioning spring and parts associated therewith. Fig. 5 is a vertical transverse section on the line 5—5 of Fig. 4. Figs. 6 and 7 are perspective views of the main members of the sliding connection. Fig. 8 is a side elevation of the combined sliding and pivoted coupling member, showing a slight modification.

In the accompanying drawing, I have shown the application of my invention to a motorcycle of the chain driven type including a counter shaft driven by a chain from the motor shaft, and operating in turn through a connecting chain to transmit motion to the rear drive wheel, but it will, of course, be understood that the invention may be applied to any desired or suitable type of cycle frame.

In carrying my invention into practice, in the illustrated embodiment shown, I provide a main or front frame section 1, which supports the driving motor 2, the front or steering wheel 3, and the seat or saddle 4, and a rear frame section 5, carrying the rear or driving wheel 6, which may be driven from the motor shaft 7 by any suitable type of drive gearing. In the present instance, a counter shaft 8 is mounted on the frame section 1 and receives motion from the shaft 7 through interposed sprocket gearing, and in turn communicates motion also through sprocket gearing to the drive wheel 6. The rear frame section 5 is pivotally mounted upon the shaft 8 for yielding movement, whereby relative vertical and longitudinal motion between the two frame sections is permitted. As shown, the said rear frame section 5 includes a curved front tube 9 and vertical stays or uprights 10, and suitably secured to the upper rear end of the tube 9 is a keeper member 11 having apertured lateral ears 12 receiving the upper ends of the stays 10, said tube 9 and stays 10 being also rigidly fastened to the lower horizontal fork bars 13 of the rear frame section whereby a staunch, rigid and durable rear frame section is provided. The said rear frame section is pivotally connected to the front frame section in such manner as to be held rigidly against lateral motion, while having an effective range or amplitude of vertical motion to the degree allowed by the cushioning spring.

The front frame 1 includes a rear upright tube 14, to the rear side of which is brazed or otherwise secured a socket bracket 15, which is inclined at an upward and rearward angle. In this socket bracket is fitted the forward end of the cushioning spring 16, which is secured therein by bolts or other suitable fastenings. The spring is of the compound or leaf type, and it extends upwardly and rearwardly from the socket bracket to a point above the keeper member 11, the rear free end of said spring being bolted or otherwise suitably attached to a coupling member 17.

As shown, the keeper member 11 comprises a plate having angle metal strips 18 formed thereon or secured thereto and providing spaced guideways 19. The coupling member 17 comprises a plate which is fitted to slide longitudinally of the keeper plate between the inwardly extending flanges of the angular strips 18 forming the guideways. At its opposite sides the coupling plate or member 17 is formed with pairs of superposed lugs or projections 20 which engage above and below the flanges, whereby the coupling member is slidably connected with the keeper member. These lugs or projections are also angular in form and act as trunnions, permitting the coupling member to have pivotal or tilting motion, as well as sliding motion upon the keeper member. Of course, any equivalent means for performing the same function, such as rollers or the like, may be employed. The coupling member is thus adapted to tilt vertically as it slides, to compensate for variations in the position of the cushioning spring, in the cushioning movements of the latter.

For the purpose of guarding the sliding portion of the spring and the parts connected therewith, a shield or housing 21 is provided, which protects the parts from possible injury by contact with extraneous objects and also prevents the entrance of dust, dirt, etc. The housing may be secured to the keeper plate by screws or other suitable fastenings 22, and is open at its forward end and provided at such end with a boot 23 which incloses the free end of the spring, thus permitting the relatively moving parts to be packed with grease or lubricant, while excluding dirt and all foreign substances.

Pivoted at its lower end, as at 24 to the tube 9 is a retarder or recoil controlling device comprising a bracket 25, which is preferably bifurcated at its upper and lower ends, the lower bifurcated end straddling the tube 9 and fastened thereto by the pivot bolt 24, while the upper end of said bifurcated bracket forms a guide for the passage of the free end of the spring 16 adjacent to the coupling connection between said spring and the rear frame. A friction roller 26 is mounted in the upper bifurcated end of the device 25 and holds the same in guided contact with the spring allowing a back and forth rolling motion of the retarder or recoil controlling device. The said retarder or recoil controlling device is normally held in a substantially vertical position against the resistance of coiled springs 27 terminally fastened to the tube 9 and bracket 25, which springs act to move the retarder forwardly and are tensioned on the backward movement of said retarder.

In the operation of my improved spring cushioning connection it will be evident that the spring 16 allows the rear frame section 5 to have vertical motion, as when riding over uneven ground or obstructions, and the two frame sections 1 and 5 to have relative longitudinal and vertical movements, which are cushioned by the action of the spring, to relieve the structure as a whole from shocks, jars and vibrations, and to insure smooth and easy riding. On the upward movement of the frame section 5, it is evident that the spring 16 is relatively depressed, bringing the spring closer to the tube 9 and reducing the binding contact between the spring and retarder 25, thus allowing said retarder to be moved forward by the action of the small springs 27, the retarder thus limiting the recoil of the spring and relative motion of the frame section 5, to overcome any excessive movement of the spring. As the frame section 5 begins to return to normal position, the spring 16 and tube 9 move farther apart, by which pressure is established on the retarding device 25 to move it backward to normal position against the resistance of the spring 27. In such backward movement the retarder has a rolling motion and thus insures a smooth and even return of the parts to normal position, eliminating excessive shocks and vibrations over the recoil of the spring and controlling the recoil in such manner as to secure a smooth cushioning action. If desired, the angular lugs or projections 20 of the coupling plate or member 17 may be provided with antifriction rollers 17', to insure free sliding and pivotal motion.

Having thus described my invention, I claim:

1. A vehicle of the character described including pivotally connected frame sections, and a leaf spring fixed at one end to one of said frame sections and slidably and pivotally connected at its opposite end to the other frame section.

2. A vehicle of the character described including front and rear pivotally connected frame sections, and a leaf spring fastened at one end to the front frame section and slidably and pivotally connected at its opposite end to the rear frame section.

3. A vehicle of the character described including pivotally connected front and rear frame sections, a keeper member on the rear frame section, a leaf spring fastened at one end to the front frame section, and a coupling member upon the other end of the spring slidably and pivotally engaging said keeper member.

4. A vehicle of the character described including pivotally connected frame sections, a leaf spring uniting said frame sections, and means for limiting the recoil of said spring.

5. A vehicle of the character described including pivotally connected frame sections, a leaf spring fixed to one frame section and movably connected with the other frame section, and means carried by the latter named frame section and engaging the movably connected end of the spring for limiting the recoil action of said spring.

6. A vehicle of the character described including front and rear pivotally connected frame sections, a leaf spring fixed at one end to the front frame section and slidably and pivotally connected at its opposite end to the rear frame section, and a retarder engaging the spring and carried by the rear frame section for limiting the recoil action of said spring.

7. A vehicle of the character described including front and rear pivotally connected frame sections, a leaf spring fixed at one end to the front frame section and slidably and pivotally connected at its opposite end with the rear frame section, and a spring actuated retarder pivotally mounted on the rear frame section and having a running engagement with the slidably and pivotally connected end of the spring, and operating to limit the recoil of said spring.

8. A vehicle of the character described including front and rear pivotally connected frame sections, the rear frame section being of a rigid type, and a leaf spring rigidly fastened at one end to the front frame section and slidably and pivotally connected at its opposite end to the rear frame section, said spring being adapted in its sliding and pivotal movements to flex vertically under the relative play of said frame sections.

9. A vehicle of the character described comprising pivotally connected frame sections, a leaf spring coupled to said frame sections, said spring being slidably and pivotally connected with at least one of said frame sections, and means for limiting the recoil of said spring.

In testimony whereof I affix my signature in presence of two witnesses.

ARTHUR A. BAMFORD.

Witnesses:
 VINNIE D. ALYEA,
 W. Q. STIDD.

Copies of this patent may be obtained for five cents each, by addressing the "Commissioner of Patents, Washington, D. C."